United States Patent [19]

Machmeier

[11] 4,152,148

[45] May 1, 1979

[54] HIGH STRENGTH, HIGH TOUGHNESS STEEL WELDING COMPOSITIONS

[75] Inventor: Paul M. Machmeier, Benbrook, Tex.

[73] Assignee: General Dynamics Corporation, Fort Worth, Tex.

[21] Appl. No.: 893,743

[22] Filed: Apr. 5, 1978

[51] Int. Cl.$^2$ .................... C22C 38/06; C22C 38/44; C22C 38/52

[52] U.S. Cl. .................... 75/124; 75/128 B; 75/128 V; 75/128 W; 228/263

[58] Field of Search .......... 228/263; 75/128 E, 128 B, 75/128 V, 124

[56] References Cited

U.S. PATENT DOCUMENTS

| | | | |
|---|---|---|---|
| 3,502,462 | 3/1970 | Dabowski et al. ................ | 75/128 B |
| 4,076,525 | 2/1978 | Little et al. ........................ | 45/128 B |

OTHER PUBLICATIONS

Linnert, "Welding Metallurgy," vol. 1, 1965, pp. 381-382.
Linnert, "Welding Metallurgy," vol. 2, 1967, pp. 199-201.

*Primary Examiner*—Arthur J. Steiner

*Attorney, Agent, or Firm*—James C. Fails; Charles E. Schurman

[57] ABSTRACT

Welding composition for welding a compatible steel having exceptionally high strength and high fracture toughness, which consist essentially of iron containing respective percents by weight of constituents as follows: 0.12-0.20 carbon, 1.8-2.2 chromium, 0.9-1.1 molybdenum, 12.0-14.5 cobalt, 9.0-10.5 nickel and a deoxidizer selected from the class consisting of (a) 0.05-0.20 manganese, (b) 0.010-0.035 aluminum, (c) 0.01-0.20 silicon, (d) a combination selected from among (a), (b), and (c), and (e) a combination selected from among (a), (b), and (c) and 0.02-0.10 vanadium; the composition having a concentration of respective constituents adjusted to have an ultimate tensile strength of 210-250 Ksi (thousands of pounds per square inch), a tensile yield strength of 200-230 Ksi and a Charpy V-Notch absorbed energy of at least 30 foot pounds and produce a weldment having satisfactory strength, toughness, and stress corrosion resistance. Also disclosed are concentration levels below which residuals impurities are maintained for effecting weldments of the requisite high strength, and high fracture toughness.

12 Claims, 4 Drawing Figures

HIGH STRENGTH, HIGH TOUGHNESS STEEL WELDING COMPOSITIONS

This invention was made in the course of or under a contract or sub-contract thereunder with the Department of the Air Force.

BACKGROUND OF THE INVENTION

1. Field of the Invention

This invention relates to a welding composition having and producing a high strength, high toughness, stress corrosion resistant steel weldment. More particular, this invention relates to a high strength, high toughness, stress corrosion resistant weldable steel filler metal that can be employed to weld high strength, high fracture toughness alloy steels and produce a satisfactory weldment that has exceptionally high ultimate tensile and yield strength in combination with both high toughness and high stress corrosion resistance that, together, make it desirable for aerospace vehicular and other fracture critical structures.

2. Description of the Prior Art

Design requirements for metallic materials used in aerodynamic structures or the like include a high strength to weight ratio, high fracture or notch toughness, high stress corrosion, and ease of fabrication. A stress corrosion resistance to fracture toughness ratio ($K_{ISCC}/K_{IC}$) greater than 0.5 is highly desirable for aircraft structural components as well as any application where the maximum operating load is two or less times the steady state sustained load. Such a ratio insures that no stress corrosion cracking will occur during sustained load operation if the structure is designed to resist brittle fracture at maximum operating load. The terms "$K_{ISCC}$" and "$K_{IC}$" are the stress intensities in units of KSI $\sqrt{inch}$ (KSI equal thousands of pounds per square inch) below which, respectively, stress corrosion cracking will not occur within 1000 hours in 3.5 percent by weight sodium chloride solution, and brittle fracture will not occur.

As referred to herein, fracture resistance is measured in terms of notch toughness (CVN, or Charpy V-Notch), a measure of resistance to fracture under impact loading expressed in foot pounds (FT-LBF) or Joules (J) in the presence of a notch. Fracture toughness ($K_{IC}$) is resistance to fracture under loading in the presence of a crack. In the welding composition of this invention, notch toughness measured as Charpy V-Notch (CVN) can be closely correlated empirically with the fracture toughness measurement obtained by the fracture mechanics test for $K_{IC}$. For example, a Charpy V-Notch value of 35 foot pounds absorbed energy is equivalent to 115 Ksi $\sqrt{inch}$ value of fracture toughness for the steels of this invention. $K_Q$ is an approximate fracture toughness value that is used because the steels of this invention are so tough that the specimens had insufficient thickness to obtain $K_{IC}$ data. Fracture resistance also is a function of stress corrosion resistance ($K_{ISCC}$) which measures resistance to crack growth in a corrosive environment under sustained load in the presence of a crack.

In U.S. Pat. No. 4,076,525, entitled "High Strength Fracture Resistant Weldable Steels," issued Feb. 28, 1978, to Clayton B. Little and Paul M. Machmeier, the descriptive matter of that patent being incorporated by reference herein for details that are omitted herefrom, there is described a wide variety of steels that have been developed for a broad spectrum of usage, including the special needs for the aerospace industry. As noted therein, many of the steels such as the HY-180, 300M D6ac, maraging steels and others provide various combinations of strength, fracture toughness and stress corrosion resistance. Some may also be welded. For example, U.S. Pat. No. 3,502,462 discloses steels in the range of up to 197 Ksi maximum yield strength (tensile) having excellent toughness and stress corrosion resistance. Despite this, there has been a need, particularly in the aerospace field, for a steel that is at once weldable and provides the best combination of low weight with good toughness and stress corrosion resistance at higher strength levels than heretofore available. Particularly, the steel should have up to about 270 Ksi ultimate strength (TUS) or about 245 Ksi yield strength (TYS) with good fatigue endurance limits. The composition of such a steel, referred to AF 1410, was provided by U.S. Pat. No. 4,076,525. However, arc welding of these exceptionally high strength, high toughness steels, using known materials, was deemed to produce weldments tending towards reduced soundness, e.g. porosity; and reduced values of mechanical properties described hereinbefore. Development of a welding composition that would provide arc-produced weldments of acceptably high quality was therefore needed.

Expressed otherwise, none of the commercially available welding compositions, or alloy steel filler metals, would meet the quality weldment requirements that allowed higher strength structures to be designed with no weight or fabricability penalties and still obtain good fracture toughness and stress corrosion resistance. Specifically, the welding composition of this invention had to provide increased resistance to crack growth in corrosive environments when compared to the prior art structural alloy steel weld metal.

From the foregoing, it can be seen that the prior art was not totally satisfactory in providing a welding composition for welding the high strength high toughness, stress corrosion resistant steels required in the aerospace industry and the like.

Specifically, none of the prior art weld wire compositions, or steel filler metals would provide the desired quality arc-produced weldments having the requisite properties in the ranges of 200–230 Ksi yield strength, 210–250 Ksi ultimate strength, and CVN equal to at least 30 foot pounds. Moreover, the prior art weld wire compositions did not provide the even more difficult to obtain combined ranges of 200–230 Ksi yield strength, 210–240 Ksi ultimate strength and CVN values of at least 35 foot pounds; and did not provide a $K_{ISCC}$ greater than 60 $\sqrt{inch}$ and $K_{IC}$ of at least 115 Ksi $\sqrt{inch}$.

SUMMARY OF THE INVENTION

Accordingly, it is an object of this invention to provide a welding composition that can be arc-welded to produce a satisfactory weldment and satisfactorily weld the high strength, high toughness, stress corrosion resistant steels for use in the aerospace industry as disclosed in U.S. Pat. No. 4,076,525 and alleviate the deficiencies of the prior art welding compositions.

It is a specific object of this invention to provide welding compositions that have and will provide the desired quality arc-produced weldments having the mechanical properties in the ranges of 200–230 Ksi yield strength, 210–250 Ksi ultimate strength and a CVN equal to at least 30 foot pounds.

It is a further object of this invention to provide welding compositions that have and will provide weldments having the ranges of 200–230 Ksi yield strength, 210–240 Ksi ultimate strength and CVN values of at least 35 foot pounds; and $K_{ISCC}$ greater than 60 $\sqrt{inch}$ and $K_{IC}$ of at least 115 $\sqrt{inch}$.

These and other objects will become apparent from the following descriptive matter, particularly when taken in conjunction with the drawings.

In accordance with this invention, there is provided a composition for welding steel having high strength and high fracture toughness as well as high stress corrosion resistance consisting essentially of iron containing, in percent by weight, 0.12–0.20 carbon, 1.8–2.2 chromium, 0.9–1.1 molybdenum, 12.0–14.5 cobalt, 9.0–10.5 nickel and a deoxidizer selected from the class consisting of (a) 0.05–0.20 manganese, (b) 0.010–0.035 aluminum, (c) 0.01–0.20 silicon, (d) a combination selected from among (a), (b), and (c), and (e) a combination selected from among (a), (b), (c) and 0.02–0.10 vanadium, the composition having the concentration of the respective ingredients adjusted to have an ultimate tensile strength of 210–250 Ksi and a tensile yield strength of 200–230 Ksi, a Charpy V-Notch absorbed energy of at least 30 foot pounds and satisfactory welding of the steel.

In preferred embodiments, the carbon is employed in a concentration within the range of 0.14–0.17 in order to get the Charpy V-Notch absorbed energy up to at least 35.

In accordance with this invention, the high strength, high fracture toughness, and stress corrosion resistance is maintained by preventing any concentration of the following impurities from being in excess of the following concentrations, the concentrations being in percents by weight unless otherwise noted: 0.01 titanium, 0.005 sulfur, 0.008 phosphorous, 0.002 for each of tin, lead, and zirconium, 0.0005 boron, 0.01 total rare earths, 30 parts per million (ppm) nitrogen, 50 ppm oxygen, and 3 ppm hydrogen.

DESCRIPTION OF PREFERRED EMBODIMENTS

Figure 1:
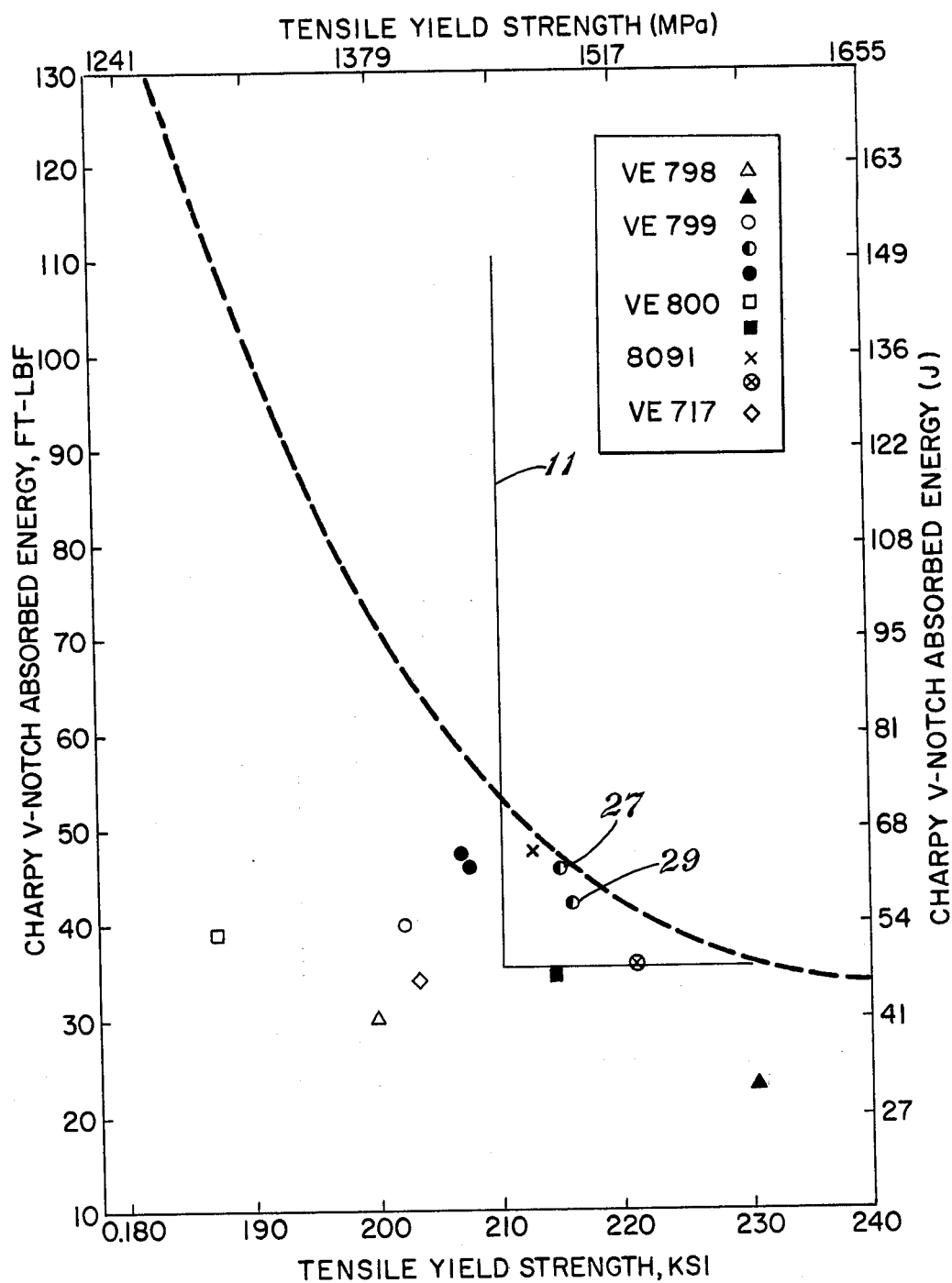
FIG. 1 is a graph showing correlation between the fusion zone mechanical properties of welding compositions and the objective range sought.

When the term "welding composition" is used herein, it is used in the engineering context of meaning the weld wire or filler metal that is employed for welding the steels under consideration herein.

Welding compositions of the low alloy medium carbon steels in the strength range herein require carbon contents in excess of 0.3 percent by weight to meet strength requirements at the expense of fracture toughness, stress corrosion resistance and weldability. The principal strengthening mechanism is the tempering of the carbon martensites which produce a precipitation of carbide particles generally detrimental to weld stress corrosion resistance at this strength level. As carbon alone is increased, there is an increased tendency for microcracking due to increased lattice strains present as a result of higher tetragonal distortion. This condition can be somewhat alleviated by adding substantial amounts of solid solution strengtheners which will reduce the level of carbon necessary to attain high strength. These strengtheners are nickel, Ni; chromium, Cr; cobalt, Co; and manganese, Mn. These alloys, although still categorized as quench and temper steels, have improved weld zone toughness and stress corrosion resistance due to the alloy martensitic matrix. Yet the prior art steels have been below the strength levels found desirable for arc welding of those structures requiring the highest strength with improved toughness and stress corrosion resistance in the weldment.

Maraging steel filler metals develop high strength as a result of complex precipitation reactions in a low carbon iron-nickel martensite formed above room temperature. During aging the maximum strengthening occurs by forming of complex nickel-aluminum, nickel-titanium, and nickel-molybdenum intermetallic compounds in the high toughness martensite matrix. As a result more toughness is possible at high strength levels than is attainable in ordinary quench and temper steels. However, the presence of titanium and aluminum in these steels require extra caution to keep the residual elements at low levels since these elements are strong carbide, nitride, and oxide formers. Formation of an excess of these compounds will result in substantial reductions in weld zone toughness. As a result of the intermetallic compounds used for strengthening and the presence of excess retained austenite, the weld fusion zone stress corrosion resistance is reduced. As delineated in U.S. Pat. No. 4,076,525 the toughness of a weld deposit is usually always below that of the parent metal and has historically presented a problem. The problem becomes unusually acute in the exceptionally high strength, high toughness steels of that invention.

High strength stainless steel filler metals capable of obtaining ultimate tensile strength exceeding 210 Ksi are usually of the semi-austenitic or martensitic precipitation hardening types. In general, all these alloys have high chromium contents necessary for good surface corrosion resistance, but as a group have low fracture toughness and stress corrosion resistance, particularly when heat treated to the maximum strength.

Analysis of structural weight efficiencies and brittle fracture resistant load capacities of available weldable steels suitable for airframe structures have indicated the need for a weld wire which can produce good arc welds having strengths and fracture toughness comparable to those of AF 1410 plate steel. Accordingly, this invention provides welding compositions which will produce weldment properties in the ranges of 210–250 Ksi, 200–230 Ksi tensile yield strength and fracture toughness of at least 115 Ksi inch.

The filler metal compositions are selected to be compatible with the AF 1410 steels both from a chemical specification and from the point of view of forming an acceptable weld. The following general principles with respect to the delineated compositions have been found helpful in formulating acceptable compositions.

The carbon is employed in a concentration within the range of 0.12–0.20 percent by weight in the welding compositions of this invention. This lower concentration of carbon has been found to be possible because other strengtheners have reduced the 0.3 percent by weight carbon previously thought necessary to meet the strength requirements. Too low a concentration of carbon, however, reduces the strength too much. On the other hand, increasing the carbon content too much above the delineated maximum concentration causes an abrupt decrease in toughness for the increase in strength that is achieved. Excellent results have been achieved with carbon concentrations within a preferred range of 0.14–0.17 percent by weight.

The obtaining of increased strength is relatively easy but maintaining the high toughness at high strength levels is very difficult. Without the presence of molybdenum, the secondary hardening reaction did not occur. The molybdenum is employed in a concentration range of 0.9–1.1 percent by weight. If the concentration of molybdenum is decreased much below 0.9, there is a loss of strength. If the concentration is molybdenum is increased much above 1.1 percent by weight, there is a gradual loss of toughness. At the 210–240 Ksi ultimate strength level, about 1.0 percent by weight molybdenum appeared to be about optimum.

The control of chromium is an important factors in producing the superior welding compositions of this invention. The major role of chromium, besides combining with molybdenum and carbon to form the alloy carbide is to increase the kinetics of the aging reaction and also to allow it to occur at lower temperatures where reduced interference from reverted austenite will result. The chromium is employed in the welding composition of this invention in a concentration within the range of 1.8–2.2 percent by weight. If much less than 1.8 percent by weight chromium is employed, there is a rapid falling off of toughness. If much more than about 2.2 percent by weight chromium is employed, the toughness also falls off.

The high cobalt content insures that the lath martensite substructure is not annealed from the successive thermal reversals occurring from multipass welding or from the post weld aging. The retained substructure provides initiation sites for the alloy carbide precipitation. The cobalt is employed in the welding compositions of this invention in range of 12.0–14.5 percent by weight. If the concentration of cobalt is employed at much lower than 12.0, there is a slight lowering of the strength. If the concentration of cobalt is employed at much above 14.5, there is a slight decrease in toughness.

The nickel is employed in this invention in a concentration within the range of 9–10.5 percent by weight. If the nickel concentration is decreased much below 9 percent by weight, there is a gradual decrease in the low temperature toughness properties, particularly at exceptionally low temperatures. If the nickel is employed in the concentration much above about 10.5 percent by weight, there is a slight decrease in the upper shelf Charpy V-Notch toughness that is measured.

The deoxidizer that is employed with welding composition of this invention must be carefully controlled, both in the type selected and the concentration thereof in view of the efficacy of the deoxidizer. Consequently, the deoxidizers are delineated by class, not only in terms of the chemical nature, but also by their concentration range in view of their efficacy. This approach is employed in order to obviate the requirements for experimentation in producing and employing the welding composition of this invention. Specifically, the deoxidizer may consist of manganese alone in the concentration within the range of 0.05–0.20 percent by weight. Similarly, the deoxidizer may consist of aluminum alone in the concentration within the range of 0.010–0.035 percent by weight. In like manner, the deoxidizer may consist of silicon alone employed in a concentration within the range of 0.01–0.20 percent by weight. Lower concentrations in the ranges given for the single deoxidizers are less effective. On the other hand, the deoxidizer may comprise a combination selected from among those delineated immediately hereinbefore. Specifically, the deoxidizer may comprise an admixture of more than one of the manganese, alumimum, and silicon in their respective delineated concentrations. It is preferable that the maximum amount delineated for the manganese, aluminum, and silicon be reduced if they are employed in combination with another of the delineated deoxidizers. For example, when aluminum and silicon are employed together, it is preferred that the aluminum be present in a concentration of about 0.015 percent by weight and the silicon be present in a concentration of about 0.16 percent by weight. Ordinarily when a plurality of, such as all three of, the manganese, aluminum and silicon are employed, it is preferred that the total concentration of the deoxidizers be not more than about 0.30 percent by weight for optimum toughness and the concentrations of the respective manganese, aluminum and silicon will be near the midpoint of the delineated range for the deoxidizers alone. For example, when all three of the deoxidizers are employed together, the concentration should not be above 0.10 percent by weight manganese, 0.015 percent by weight aluminum and 0.1 percent by weight silicon.

In addition, the deoxidizer may comprise a concentration of 0.02–0.1 percent by weight vanadium in combination with either of the manganese alone, aluminum alone, silicon alone, or a combination of more than one of the manganese, aluminum and silicon. Similarly as noted hereinbefore with respect to the combinations selected from among the manganese, aluminum and silicon, the combination of vanadium therewith makes desirable for optimum toughness that a total concentration of the plurality of deoxidizers selected from among manganese, aluminum and silicon not exceed about 0.25, and preferably be near their midpoint of their delineated concentration ranges. For example, the deoxidizer may comprise vanadium in a concentration within a range of 0.02–0.1 percent by weight and an additional deoxidizer selected from the class consisting of: (a) 0.010–0.020 percent by weight aluminum, (b) 0.1–0.2 percent by weight silicon and (c) 0.05–0.15 percent by weight manganese. When the vanadium is employed with the additional deoxidizer, it is preferable that the additional deoxidizer be employed in a concentration of about (a) 0.015 percent by weight aluminum, (b) 0.15 percent by weight silicon, and (c) 0.10 percent by weight manganese. The delineated concentration is particularly preferred if all three of the additional oxidizers are employed together in combination with the vanadium.

According to this invention, the iron base alloy filler metal steels within the chemical composition range is set forth hereinbefore will exceed the minimum properties delineated hereinbefore when aged at intermediate temperatures. In these filler metals, or weld wires, however it is necessary to maintain the solid and gaseous impurity elements at low levels to maintain the toughness and stress corrosion resistance properties. Specifically, the welding composition must not have, either before or after welding, any concentration of the following impurities in excess of the following concentrations:

| Impurities | Maximum Allowable Concentration (Percent by Weight unless otherwise noted) |
|---|---|
| titanium | 0.01 |
| sulfur | 0.005 |
| phosphorous | 0.008 |
| tin | 0.002 |
| lead | 0.002 |
| zirconium | 0.002 |
| boron | 0.0005 |
| rare earths | 0.01 |
| nitrogen | 30ppm* |
| oxygen | 50ppm* |
| hydrogen | 3ppm* |

*ppm equal parts per million.

As will be appreciated by those skilled in this art, maintaining such low levels of impurities may require high purity melt charges in conjunction with vacuum induction melting and/or vacuum arc remelting.

By control of the microstructure both in the as welded and post weld aged condition [in the 900°–950° F. (482°–510° C.) post weld aging temperature range] it is possible to obtain near optimum strength, notch toughness, and stress corrosion properties. Weld wires or filler metals produced in accordance with this invention will obtain 207 Ksi yield strength, 220 Ksi ultimate yield strength, at a CVN absorbed energy of 48 foot pounds force when post weld aged at 950° F. for four hours. The corresponding $K_Q$ and $K_{ISCC}$ are 99–139 Ksi $\sqrt{\text{inch}}$ and 80–90 Ksi $\sqrt{\text{inch}}$, respectively on the better steels produced. Improved weld metal toughness and stress corrosion resistance at high strength levels is evidenced when the fusion zone is aged at 900°–950° F. after welding in accordance with this invention. Other welded commercial steels generally cannot meet a $K_{ISCC}/K_{IC}$ of greater than 0.5 at 220 Ksi ultimate tensile strength.

ADDITIONAL DISCUSSION OF METALLURGY

The following discussion is a brief description of the microstructural differences evident at the early stages of welding or post weld aging. Standard optical and electron microscopy techniques were used to analyze the microstructure and verify the conclusions. Fractography was done with conventional scanning electron microscope techniques.

AS DEPOSITED WELD METAL USING A SINGLE PASS

In the as deposited condition, the weld wire or filler metal of this invention, designated CW-GTAW, weld metal microstructure of the last or single weld pass consists of dislocated parallel lath martensite with interlath films of stabilized austenite. Auto-tempered carbides, for example, widmanstatten cementite platelets and spheroidized cementite particles to a limited extent are present within the laths.

MULTIPASS WELD METAL

CW-GTAW weld metal subject to three or more thermal reversals had a refined lath martensitic structure. This is consistent with observations made in an Fe-Ni-C alloy where rapid re-austenitizing led to considerable martensitic refinement. Considerable more reverted austenite was present in the multipass weld microstructures which appeared as an interlath film. Due to the thermal reversals, the carbides which are present are complex and quite diverse. Complex carbides of the type $M_2C$ and $M_3C$ where M equals Fe, Mo, Cr and $M_7C_3$ type where M equals Cr, Mo have been identified.

POST WELD AGED MULTIPASS WELD METAL

The microstructure from the multicycled fusion zone weld metal did not change significantly when post weld aged at 950° F. The dislocated lath martensite structure was not significantly affected by this aging treatment as recovery in the substructure was minor as evidenced by the fairly high dislocation densities. However, the amount of reverted austenite nucleated at the interlath boundary and intralath sites proved to be quite extensive.

The complexity of the precipitated carbides is less than reported for the unaged condition as the cementite platelets have completely gone into solution. This indicates that the post weld aging at 950° F. of CW-GTAW weldments possibly results in a slightly overaged microstructure when the additive effects of thermal cycling and aging are considered. Alloy carbides identified as $M_2C$ were present at martensite lath boundaries and intralath dislocation sites. Meanwhile the globular $M_7C_3$ precipitates appear to be decreasing in size.

As can be inferred from the foregoing the type of welding process employed affects the final weldment, both in chemical composition and microstructure. Certain welding processes cause depletion of certain constituents, as is recognized. Yet, it is critical that the concentrations of the constituents be within the described ranges for the described properties, even in the finished weldment. Accordingly, in producing the commercial embodiments of this invention, the compositions of the weld wires or filler metals will be adjusted for the particular welding process in which they will be employed. Specifically, where respective lowering of concentrations of constituents are to be expected during a type of welding, their concentrations should be on the high side in order that the composition before and after welding is within the ranges delineated herein. For example, the potential loss of carbon in the hot wire gas tungsten arc welding process or the plasma arc welding process makes advisable employing a concentration of carbon at or near the top of its described range.

Figure 2:
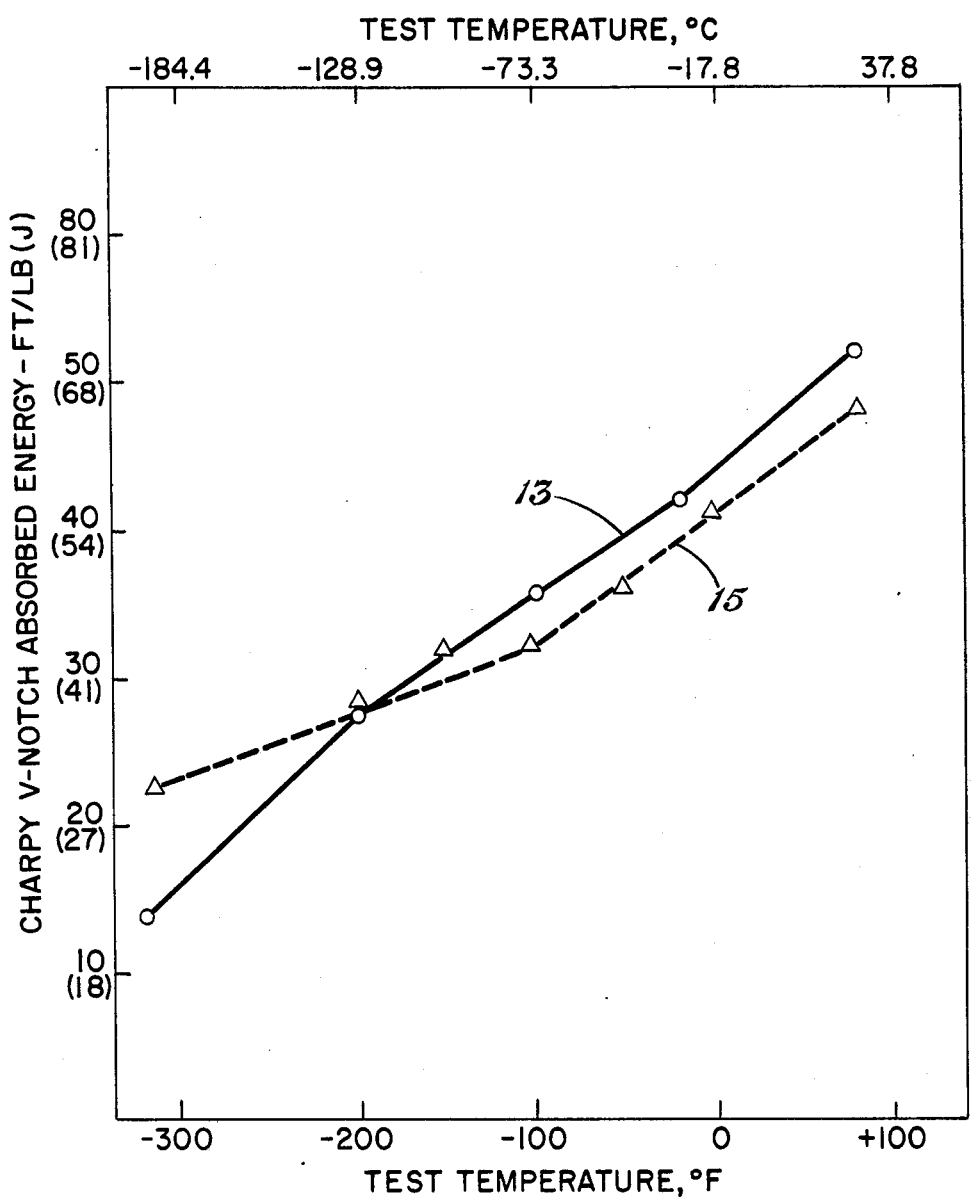
FIG. 2 is a graph showing the comparision of the physical properties versus temperature of the welding composition of this invention compared to one of the best available steel compositions.

In operation of this invention, the high-strength high-toughness steels delineated herein before are welded with the welding composition of this invention to produce a satisfactory weldment. The best steels that are immediately available and are described in U.S. Pat. No. 4,076,525 are compatible with the welding composition herein so as to produce a satisfactory weld from the standpoint of weld soundness, microstructure and mechanical properties. Specifically, the steel, in whatever form such as sheets, plates or the like is welded with the weld wire or filler metal as described herein. As will be apparent from the examples herein, satisfactory weldments are produced. This can be seen in FIG. 1 which is a correlation between the fusion zone mechanical properties and the respective points of data of the welding compositions of this invention. In FIG. 1 the tensile yield strength is shown along the X axis, the bottom one being given in thousands of pounds per square inch (Ksi.) and the top one being in Mega Paschals (MPa). The Charpy V-Notch, or CVN absorbed energy, in foot pounds of force or Joules (J) are given. It is desired to have a tensile strength greater than 210 Ksi. and a CVN above 35 foot pounds force, as shown by the window 11. In particular it is desirable that the weldment produced by the welding composition of this invention have a Charpy V-Notch absorbed energy close to that of the best steel available. This becomes particularly critical at low temperatures such as operating aerospace vehicles at the low temperature of space. FIG. 2 illustrates the effect of test temperature on the notch toughness of both a base steel, the best available, and on a weldment produced by the welding composition of this invention. The line 13 shows a Charpy V-Notch versus temperature plot for the best available steel such as described in U.S. Pat. No. 4,076,525. The line 15 shows the Charpy V-Notch versus temperature curve for the weldment produced in accordance with this invention. As can be seen, the weldment is actually superior to the base steel below minus 200° F. which is very surprising. In general it is comparable.

One property that is most significant in crack prone structures is the rate of crack propagation. In this test, the crack is initiated in a coupon and the rate of crack growth in the fatigue mode is checked in dry air and in a corrosive environment, such as a 3.5 percent by weight sodium chloride solution. The graph of the plot of the crack propagation rate versus stress intensity is give in FIGS. 3 and 4 in the respective environments of dry air and sodium chloride solution. Therein, the rate of crack propagation da/dN is defined in $10^{-6}$ inches/cycle. A correlation for the plate steel is given by Equation 1:

$$da/dN = 7.010 \times 10^{-9} \Delta K^{2.136} \qquad (I)$$

This equation is good for dry air whereas the equation for the plate steel in the sodium chloride solution is described by equation II:

$$da/dN = 1.726 \times 10^{-8} \Delta K^{1.986} \qquad (II)$$

In these equations the terms are as follows:
  da equals the incremental rate of crack growth
  dN equals the incremental number of cycles of a cyclic stress in the fatigue mode,
  K equals the stress intensity factor, and
  $\Delta K$ equals the difference in maximum and minimum stress intensity factors imposed in the test.

The stress intensity range, $\Delta K$, is plotted along the X axis whereas the crack propagation rate is plotted along the Y axis. As can be seen, metric plots are also included to assist in correlation. In referring to FIG. 3, the line 17 is the plate steel. It was hoped that the weldment produced by the welding composition of this invention would be somewhere close to it. In fact, as shown by the plot 19 the points were as good as the plate steel. This was unexpected. The correlation for the weldment in the fusion zone produced by the welding composition of this invention are given by equation III:

$$da/dN = 2.810 \times 10^{-10} \Delta K^{2.790} \qquad (III)$$

Figure 3:
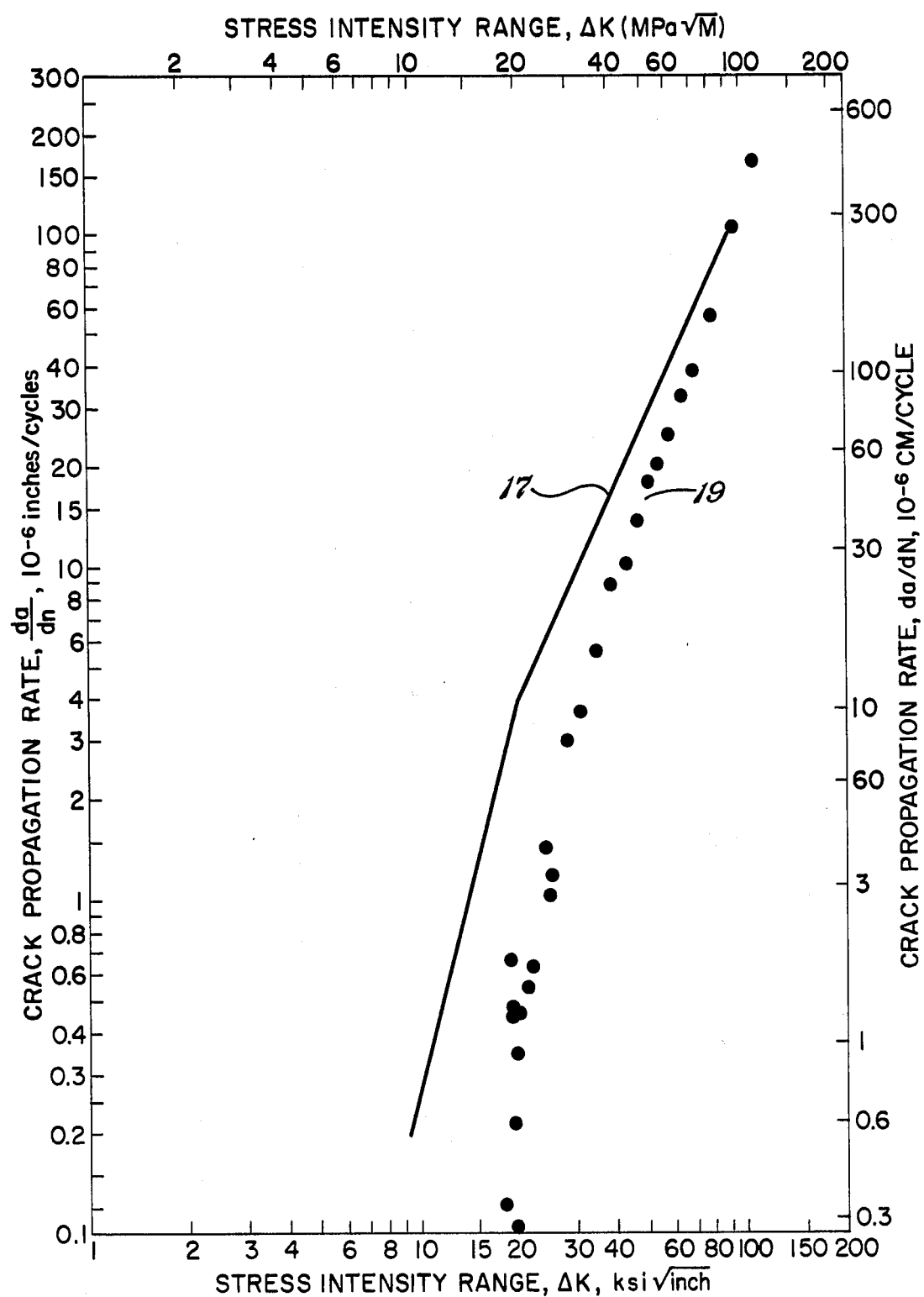
FIG. 3 is a graph showing a comparison of the rate of crack propagation versus stress intensity for the welding composition of this invention with one of the best available steels, the growth being measured in dry air.

In FIG. 3, the weldment was post weld aged at 950° F. (510° C.) for four hours, water quenched, and tested at 6 Hertz with R equal to 0.1, where R is the stress ratio.

Figure 4:
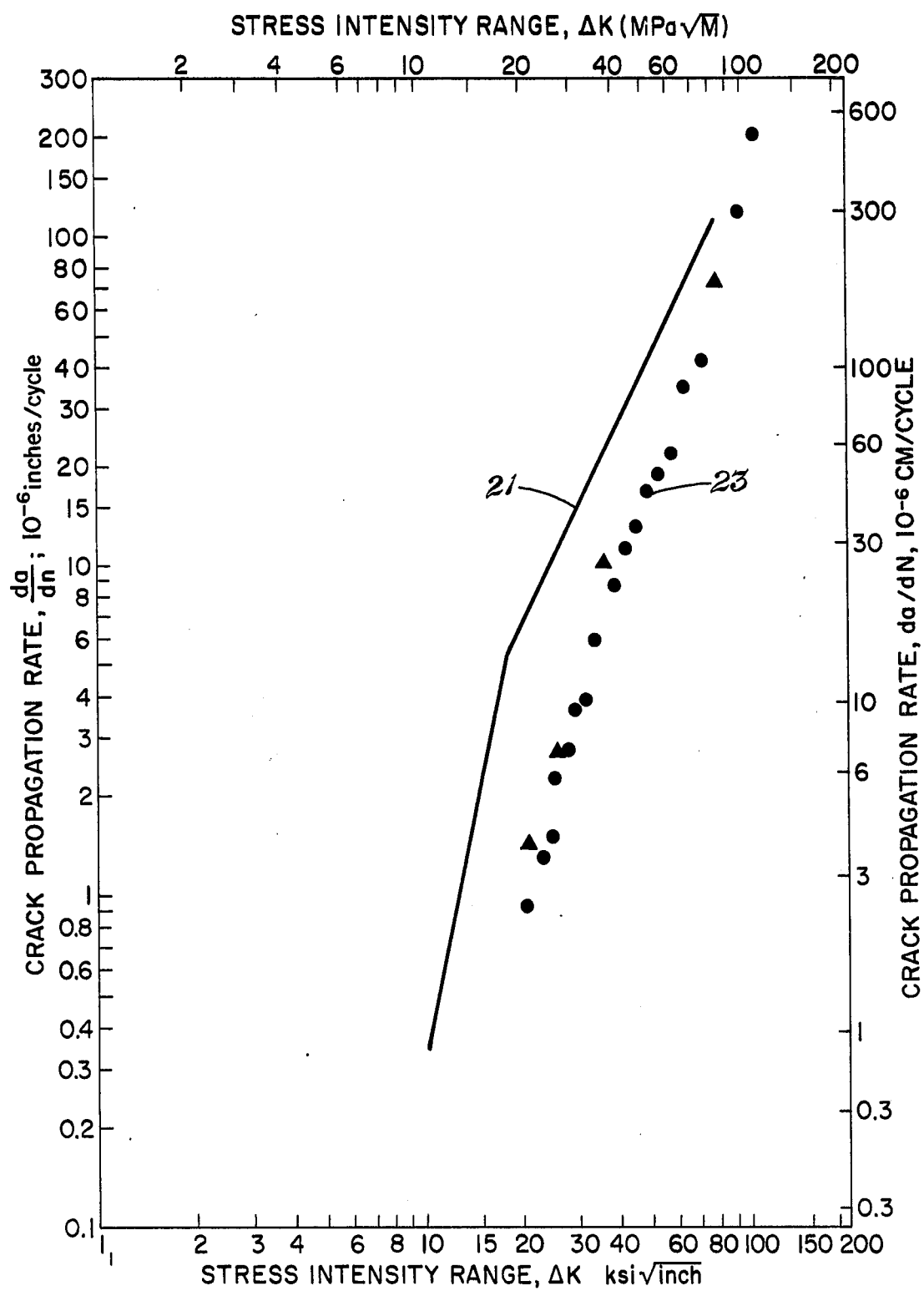
FIG. 4 is a graph showing a comparison of the rate of crack propagation versus stress intensity for the welding composition of this invention with one of the best available steels, the comparison being in a 3.5 percent by weight sodium chloride solution.

Referring to FIG. 4, the plate steel is shown by the line 21 whereas the plot of the weldment formed with the welding composition of this invention is shown by the plot 23. Again this shows that the weldment was as good as the plate steel, even in the corrosive environment. This was surprising. In FIG. 4, the correlation of the crack propagation rate given by the data shown in round data points (0.1 Hertz data) is given by equation IV:

$$da/dN = 1.985 \times 10^{-10} \Delta K^{2.953} \qquad (IV)$$

The correlation for the crack propagation rate for the triangular data points (1 Hertz data) is given by equation V:

$$da/dN = 6.265 \times 10^{-11} \Delta K^{3.206} \qquad (V)$$

In FIG. 4, the weldment was post weld aged at 950° F., (510° C.) for four hours, water quenched, and tested at 0.1 & 1 Hertz, R=0.1.

These results are surprising when compared to the prior art weldments.

The following examples will delineate some of the best compositions of this invention to obviate the requirement for experimentation in practicing this invention.

EXAMPLE 1

After an extended time of experimenting with metallurgy for aerodynamic vehicles and trying to develop the highest possible toughness and strength in combination with the highest stress corrosion resistence, a nominal chemical composition was given to an outside specialty steel company for melting and a composition for a weld wire or filler metal was returned.

The analyses for these Tables were done by conventional techniques. The analyses for the filler metals were done by an outside consultant, National Spectrographic Corporation of Ohio. The conventional techniques are well documented and need not be delineated herein, since they are commercially available from consulting laboratories such as the delineated outside consultant.

Table I delineates this typical filler metal chemical analysis range in terms of both the nominal chemical composition asked for and the actual received, designated as heat VE 799. The elements are listed on the left.

Table 1

| TYPICAL FILLER METAL CHEMICAL ANALYSIS RANGE | | |
|---|---|---|
| Elements | Chemical Composition Nominal* | Heat VE799 Chemistry |
| Co | 14.0 ±0.5 | 13.76 |
| Ni | 10.0 ±0.5 | 9.82 |
| Cr | 2.0 ±0.2 | 1.90 |
| Mo | 1.0 ±0.1 | 1.00 |
| C | 0.16 ±0.01 | 0.15 |
| Deoxidizing Elements | | |
| Mn | <0.2 | <0.05 |
| Al | <0.025 | 0.025 |
| Si | <0.2 | <0.01 |
| V | <0.1 | <0.01 |
| Impurity/Residual Elements | | |
| Ti | 0.01 MAX | <0.01 |
| Sn | 0.002 MAX | — |
| Pb | 0.002 MAX | — |
| Zr | 0.002 MAX | — |
| B | 0.0005 MAX | — |
| rare earths | 0.01 MAX | — |
| S | 0.005 MAX | 0.005 |
| P | 0.008 MAX | <0.001 |
| O | 30 ppm MAX | 52 ppm |

Table 1-continued

| TYPICAL FILLER METAL CHEMICAL ANALYSIS RANGE | | |
|---|---|---|
| N | 30 ppm MAX | 4 ppm |
| H | 5 ppm MAX | 1 ppm |

*Nominal compositions include most of the best compositions claimed herein.

A variety of welds were made on the best available steel, designated as AF 1410 and described in U.S. Pat. No. 4,076,525. The composition of the filler wire and of the ingot steel is set forth in Table 2, also denoted heat VE 799.

Table 2

| | Heat 799 | |
|---|---|---|
| Element | Ingot | Filler Wire |
| C | 0.14 | 0.15 |
| Co | 14.05 | 13.76 |
| Ni | 9.71 | 9.82 |
| Cr | 2.10 | 1.90 |
| Mo | 1.09 | 1.00 |
| Si | 0.03 | <0.01 |
| Al | 0.019 | 0.025 |
| V | 0.02 | <0.01 |
| Mn | 0.01 | <0.05 |
| Ti | 0.005 | <0.01 |
| S | 0.004 | 0.005 |
| P | 0.005 | <0.001 |
| O | — | 52 ppm |
| N | — | 4 ppm |
| H | — | 1 ppm |

Table 3 delineates the specific properties and data points found for the filler metal for Heat VE 799 showing the "as deposited" data, the data after post weld aging for the indicated hours at the indicated temperature, followed by water quenching (WQ). The respective columns show the yield strength, the ultimate strength in Ksi, the elongation in percent (%) for a one inch specimen, the reduction of area in percent (%) and the Charpy V-Notch absorbed energy in foot pound force (FT-LBF). The columns also show the metric equivalents in parenthesis. This run gave the two points 27 and 29 in FIG. 1 within the window 11 and show that the results sought were obtained in accordance with this invention. Specifically, the points 27 and 29 represent the data from the heat VE799 after aging at 900° F. (482° C.). In addition these weldments employing this filler metal composition had the stress corrosion resistance required and served as the samples for the data reported in FIGS. 2-4. Moreover, the weldments produced by the filler metal of this example gave the best weldments in terms of metallurgical properties such as delineated herein before.

Table 3

| | Filler Metal Heat VE 799 | | | | |
|---|---|---|---|---|---|
| Post Weld Age | Yield Strength Ksi (MPa) | Ultimate Strength, Ksi (MPa) | Elongation 1 inch, % | Reduction of Area, % | Charpy V-Notch Absorbed Energy, ft-lbf (J) |
| As Deposited | 202.4 (1395) | 223.3 (1540) | 16.0 | 57.1 | *40.1, 40.7 (54.4) (55.2) |
| 900° F.-2 hrs/WQ (482° C.) | 211.7 (1460) | 223.7 (1542) | 16.0 | 63.0 | 42.9, 44.1 (58.2) (59.8) |
| 900° F.-4 hrs/WQ (482° C.) | 211.5 (1458) | 221.5 (1527) | 16.0 | 62.5 | *34.1, 36.2 (46.2) (49.1) |
| 900° F.-8 hrs/WQ | 214.9 (1481) | 219.9 (1516) | 15.0 | 64.9 | 40.9, 42.9 (55.5) (58.2) |
| 900° F.-12 hrs/WQ (482° C.) | 213.3 (1471) | 220.3 (1519) | 14.0 | 60.5 | 44.6, 45.8 (60.5) (62.1) |
| 950° F.-2 hrs/WQ (510° C.) | 207.7 (1432) | 215.1 (1483) | 14.0 | 62.0 | 46.0, 48.2 (62.4) (65.4) |
| 950° F.-4 hrs/WQ (510° C.) | *207.2 (1429) | 219.2 (1511) | 16.5 | 65.2 | *36.2, 37.2 (49.1) (50.4) |
| 950° F.-4 hrs/WQ (510° C.) | — | — | — | — | 47.5, 48.0 (64.4) (65.1) |
| 950° F.-8 hrs/WQ (510° C.) | 202.8 (1398) | 210.7 (1453) | 15.0 | 63.0 | 48.3, 48.8 (65.5) (66.2) |
| 950° F.-12 hrs/WQ (510° C.) | 203.4 (1402) | 208.4 (1437) | 15.0 | 62.2 | 50.5, 52.8 (68.5) (71.6) | longitudinal tensile orientation
Transverse CVN orientation
*First Weld Series

EXAMPLE 2

In this example, the best available steel was welded by a filler wire having a different composition. The respective compositions of the ingot of steel and the filler wire are given in Table 4 and designated Heat 800. In Table 4 the concentrations are given percent unless shown in parts per million (ppm). The resulting test data is shown in Table 5. The headings of Table 5 are the same as those for Table 3 and are described hereinbefore.

Table 4

| | Heat 800 | |
|---|---|---|
| Element | Ingot | Filler Wire |
| C | 0.15 | 0.16 |
| Co | 14.44 | 14.06 |
| Ni | 9.93 | 9.99 |
| Cr | 2.20 | 1.94 |
| Mo | 1.02 | 1.06 |
| Si | 0.10 | 0.16 |
| Al | 0.044 | 0.031 |
| V | 0.02 | <0.01 |
| Mn | 0.02 | <0.05 |
| Ti | 0.005 | <0.01 |
| S | 0.003 | 0.005 |
| P | 0.004 | <0.001 |
| 0 | 23 ppm | 74 ppm |
| N | 3 ppm | 2 ppm |
| H | 1 ppm | 2 ppm |

Table 5

| Post Weld Age | Filler Metal Heat VE 800 | | | | |
|---|---|---|---|---|---|
| | Yield Strength Ksi (MPa) | Ultimate Strength, Ksi (MPa) | Elongation 1 inch, % | Reduction of Area, % | Charpy V-Notch Absorbed Energy, ft-lbf (J) |
| As Deposited | 187.2 (1291) | 223.3 (1540) | 15.5 | 60.9 | *38.4, 39.9 (52.1)(54.1) |
| 900° F.-4 hrs/WQ (482° C.) | — | — | — | — | *28.6, 28.9 (38.8) (39.2) |
| 950° F.-4hrs/WQ (510° C.) | 213.9 (1475) | 222.9 (1537) | 15.5 | 65.0 | *32.9, 33.1 (44.6) (44.9) | longitudinal tensile orientation
Transverse CVN orientation
*First Weld Series

EXAMPLE 3

This example is included to show that the welding composition, or filler wire compositions, of this invention produce satisfactory weldments in the "as deposited" conditions, without requiring further heat treatment or the like.

Table 6 shows typical compositions of ingots and filler wires for tested specimens designated as VE heats 717 and 7318 - 8091.

Table 6 shows test data. The data point shown by an "X" in FIG. 1 shows the plot for the heat 8091; while the "X" within the circle shows the plot following aging for over 4 hours at 950° F. (510° C.). The illustrative data for heat VE 717 is plotted as the diamond shaped plot in FIG. 1.

Table 6

| | Filler Metal Chemical Analysis | | | |
|---|---|---|---|---|
| | Heat 717 | | Heat 7318-8091 | |
| Element | Ingot | Filler Wire | Ingot | Filler Wire |
| C | 0.16 | 0.15 | 0.14 | 0.14 |
| Co | 15.13 | 14.40 | 13.41 | 14.26 |
| Ni | 10.77 | 9.95 | 9.75 | 9.80 |
| Cr | 2.05 | 2.18 | 1.90 | 1.81 |
| Mo | 0.93 | 0.95 | 1.20 | 1.34 |
| Si | 0.11 | 0.12 | 0.10 | 0.13 |
| Al | 0.028 | 0.30 | 0.023 | 0.040 |
| V | — | 0.01 | 0.08 | 0.09 |
| Mn | <0.032 | <0.03 | 0.11 | 0.12 |
| Ti | <0.01 | <0.01 | <0.01 | <0.01 |
| S | 0.005 | 0.008 | 0.003 | <0.005 |
| P | 0.006 | 0.006 | 0.001 | <0.005 |
| O | 28 ppm | 10 ppm | — | 80 ppm |
| N | 4 ppm | 5 ppm | 30 ppm | 30 ppm |
| H | 1 ppm | 1 ppm | — | — |

The following notes are believed helpful in interpreting the data given hereinbefore and in practicing this invention.

1. In all instances, the tensile and CVN data reported are longitudinal and transverse fusion zone data, respectively, from cold wire gas tungsten arc welds (CW-GTAW).

2. The goals of 35 foot pound CVN energy at 210–230 Ksi yield strength was met by filler metal compositions in both the as-deposited and post weld aged condition (950° F.). Depending on the yield strength desired the as-deposited weld structure deposited by the CW-GTA, is suitable for use after 3 or more thermal reversals have been accomplished for refinement. When post weld aged at 950° F., generally the yield strength increased and the absorbed energy decreased.

3. The as-deposited fusion zone microstructure was coarse grained with lath martensite as the principal decomposition product. By increasing the number of thermal reversals by the use of low deposition rate weld processes, e.g. CW-GTAW etc, the increased fusion zone refinement increases the weld zone toughness. The degree of refinement usually depends on the size of the deposited weld bead and subsequent number of thermal reversals it experiences.

Several other compositions of filler metals and weld wires were tried in many of these, one or more of the constituents would be outside the range delineated herein before, so the weldment formed thereby would be inferior in either its toughness, strength, or stress corrosion resistance. While these tests do not serve as examples of this invention they do delineate the extreme care that must be taken in the controlled addition of the deoxidizers, as well as the other constituents, to provide a filler metal of satisfactory properties.

From the foregoing, it can be seen that the objects of this invention have been accomplished. Specifically, Table 7

| Post Weld Age | Fusion Zone Mechanical Properties | | | | |
|---|---|---|---|---|---|
| | Cold Wire Gas Tungsten Arc Welds 0.625 inch (1.59cm) thick plate | | | | |
| | Yield Strength Ksi (MPa) | Ultimate Strength Ksi (MPa) | Elongation 1 in, % | Reduction of Area % | Charpy V-Notch Absorbed Eneregy ft - lhf(J) |
| | Filler Metal Heat VE 717 | | | | |
| As-Deposited | 202.6 | 229.1 | 19.0 | 66.7 | 35.4 |
| 950° F.-4 hrs/WQ | 225.0 | 229.9 | 13.0 | 54.7 | 24.0 |
| | Filler Metal Heat 7318-8091 | | | | |
| As-Deposited | 213.3 | 239.0 | — | 63.5 | 45.5 |
| 950° F.-4 hrs/WQ | 223.0 | 233.0 | 14.0 | 62.7 | 34.5 | weld wire, or filler metal, compositions are delineated that obviate the problems of the prior such welding compositions and produce satisfactory, tough, high strength weldments with the best steel available, as described in U.S. Pat. No. 4,076,525.

Having thus described the invention, it will be understood that such description has been given by way of example and illustration and not by way of limitation, reference for the latter purpose being had to the appended claims.

What is claimed is:

1. A weld wire or filler metal composition for the welding of steels having high strength and high fracture toughness in the range of ultimate tensile strength of 220–270 Ksi, a tensile yeidl strength of 210–245 Ksi and a fracture toughness ($K_{IC}$) greater than 115 Ksi $\sqrt{}$inch, the steels having a composition that is compatibly weldable with the weld wire or filler metal composition, which consists essentially of respective concentrations in percents by weight of constituents as follows: 0.14–0.17 carbon, 1.8–2.2 chromium, 0.9–1.1 molybdenum, 12.0–14.5 cobalt, 9.0–10.5 nickel, and a deoxidizer selected from the class consisting of: (a) 0.015–0.035 aluminum, (b) 0.10–0.20 silicon, (c) a combination selected from among (a), (b) and 0.05–0.20 manganese, and (d) a combination selected from among 0.02–0.10 vanadium, 0.05–0.20 manganese, 0.010–0.035 aluminum, 0.01–0.20 silicon, and the remainder iron; said composition having its concentration of respective constitutents adjusted to produce in the weldment fusion zone an ultimate tensile strength of 210–240 Ksi, a tensile yield strength of 200–230 Ksi and a Charpy V-Notch absorbed energy of at least 35 foot pounds.

2. The composition of claim 1 wherein said deoxidizer consists essentially of: 0.05–0.15 percent by weight manganese; 0.015–0.025 percent by weight aluminum; and 0.1–0.20 percent by weight silicon.

3. The composition of claim 1 wherein said deoxidizer consists essentially of 0.015–0.035 percent by weight of aluminum.

4. The composition of claim 3 wherein said aluminum is present in a concentration within the range of 0.015–0.030 percent by weight.

5. The composition of claim 1 wherein said deoxidizer consists essentially of about 0.03 percent by weight aluminum and about 0.16 percent by weight of silicon.

6. The composition of claim 1 wherein said deoxidizer consists essentially of manganese, aluminum and silicon and the concentration is no more than about 0.10 percent by weight manganese, 0.015 percent by weight aluminum and 0.1 percent by weight silicon.

7. The composition of claim 1 wherein said deoxidizer includes 0.02–0.1 percent by weight vanadium and an additional deoxidizer selected from the class consisting of: (a) 0.010–0.020 percent by weight aluminum, (b) 0.1–0.2 percent by weight silicon, and (c) 0.05–0.15 percent by weight manganese, and (d) combinations thereof.

8. The composition of claim 7 wherein said concentration and said additional deoxidizer is selected from the class consisting of: (a) about 0.015 percent by weight aluminum, (b) about 0.15 percent by weight silicon, and (c) about 0.10 percent by weight manganese, and (d) combinations thereof.

9. The composition of claim 1 wherein said composition does not have either before or after welding any concentration of the following impurities in excess of the following concentrations:

| Impurities | Maximum Allowable Concentration (Percent by Weight unless otherwise noted) |
|---|---|
| titanium | 0.01 |
| sulfur | 0.005 |
| phosphorous | 0.008 |
| tin | 0.002 |
| lead | 0.002 |
| zirconium | 0.002 |
| boron | 0.0005 |
| rare earths | 0.01 total |
| nitrogen | 30ppm* |
| oxygen | 50ppm* |
| hydrogen | 3ppm* |

*ppm designating parts per million.

10. The composition of claim 1 in the form of a weldment that has respective concentrations of respective constituents within the ranges recited in claim 1.

11. The composition of claim 1 wherein said deoxidizer is selected from the class consisting of a combination of a plurality of the deoxidizers manganese, aluminum and silicon and the total concentration thereof does not exceed 0.3.

12. A weld wire or filler metal composition for the welding of steels having high strength and high fracture toughness in the ranges of ultimate tensile strength of 220–270 Ksi, a tensile yield strength of 210–245 Ksi and a fracture toughness ($K_{IC}$) greather than 115 Ksi $\sqrt{}$inch, the steels having a composition that is compatibly weldable with the weld wire or filler metal composition, which consists essentially of respective concentrations in percents by weight of consitutents as follows: 0.12–0.20 carbon, 1.8–2.2 chromium, 0.9–1.1 molybdenum, 12.0–14.5 cobalt, 9.0–10.5 nickel, and a deoxidizer selected from the class consisting of: (a) 0.015–0.035 aluminum, (b) 0.10–0.20 silicon, (c) a combination selected from among (a), (b), and 0.05–0.20 manganese, and (d) a combination selected from among 0.02–0.10 vanadium, 0.05–0.20 manganese, 0.010–0.035 aluminum, and 0.01–0.20 silicon, and the remainder iron; said composition having its concentration of respective constituents adjusted to produce in the weldment fusion zone an ultimate tensile strength of 210–250 Ksi, a tensile yield of 200–230 Ksi and a Charpy V-Notch absorbed energy of at least 30 foot pounds.

* * * * *